United States Patent
Shimura

(10) Patent No.: US 9,726,839 B2
(45) Date of Patent: Aug. 8, 2017

(54) BIDIRECTIONAL OPTICAL COMMUNICATION MODULE

(71) Applicants: Oki Electric Industry Co., Ltd., Tokyo (JP); Photonics Electronics Technology Research Association, Tokyo (JP)

(72) Inventor: Daisuke Shimura, Tokyo (JP)

(73) Assignees: Oki Electric Industry Co., Ltd., Tokyo (JP); Photonics Electronics Technology Research Association, Tokyo (JP)

( * ) Notice: Subject to any disclaimer, the term of this patent is extended or adjusted under 35 U.S.C. 154(b) by 0 days.

(21) Appl. No.: 14/973,836

(22) Filed: Dec. 18, 2015

(65) Prior Publication Data

US 2016/0291268 A1    Oct. 6, 2016

(30) Foreign Application Priority Data

Mar. 30, 2015    (JP) ................................. 2015-069077

(51) Int. Cl.
    *G02B 6/42*    (2006.01)
(52) U.S. Cl.
    CPC ......... *G02B 6/4246* (2013.01); *G02B 6/4215* (2013.01); *G02B 6/4292* (2013.01); *G02B 6/421* (2013.01); *G02B 6/428* (2013.01); *G02B 6/4214* (2013.01)
(58) Field of Classification Search
    CPC .................................... G02B 6/42; G02B 6/12
    USPC ......................................................... 385/14
    See application file for complete search history.

(56) References Cited

U.S. PATENT DOCUMENTS

| | | | | |
|---|---|---|---|---|
| 6,043,550 A | * | 3/2000 | Kuhara et al. ................. | 257/461 |
| 6,374,021 B1 | * | 4/2002 | Nakanishi et al. ............. | 385/49 |
| 6,748,143 B2 | * | 6/2004 | Kuhara et al. .................. | 385/49 |
| 6,793,410 B2 | * | 9/2004 | Nakanishi et al. ............. | 385/92 |
| 6,877,914 B2 | * | 4/2005 | Okada et al. ................... | 385/92 |
| 7,103,238 B2 | * | 9/2006 | Shyu et al. ...................... | 385/14 |
| 7,140,131 B2 | * | 11/2006 | Kimura ........................... | 38/18 |
| 8,204,378 B1 | * | 6/2012 | Marsland et al. .............. | 398/65 |

(Continued)

FOREIGN PATENT DOCUMENTS

| | | | | |
|---|---|---|---|---|
| JP | 10-206678 A | | 8/1998 | |
| JP | 11068705 A | * | 3/1999 | ............. H04J 14/00 |
| JP | H11-68705 A | | 3/1999 | |

*Primary Examiner* — Kaveh C Kianni
(74) *Attorney, Agent, or Firm* — Rabin & Berdo, P.C.

(57) ABSTRACT

There is provided a bidirectional optical communication module including a bidirectional optical communication chip configured to include an optical circuit board in which a light receiving element constituting a receiving section, a transmitting element constituting a transmitting section, and a wavelength-division multiplexing (WDM) filter that divides transmission signal light and reception signal light from each other are hybrid-integrated, a reflecting section configured to direct a propagation direction of the transmission signal light output from the transmitting section and the reception signal light received by the receiving section to a direction orthogonal to the optical circuit board, and an optical coupling element configured to spatially optically-couple an input-output port for the transmission signal light and the reception signal light provided at the bidirectional optical communication chip to an input-output port of an optical fiber.

11 Claims, 6 Drawing Sheets

(56) References Cited

U.S. PATENT DOCUMENTS

| | | | |
|---|---|---|---|
| 2002/0039464 A1* | 4/2002 | Yoshimura et al. | 385/14 |
| 2004/0101259 A1* | 5/2004 | Kilian | 385/93 |
| 2014/0340487 A1* | 11/2014 | Gilliland et al. | 348/48 |
| 2015/0110493 A1* | 4/2015 | Khor et al. | 398/88 |
| 2016/0252690 A1  | 9/2016 | Kawamura | G02B 6/42 |
| 2016/0291268 A1* | 10/2016 | Shimura | G02B 6/42 |

* cited by examiner

BIDIRECTIONAL OPTICAL COMMUNICATION MODULE

CROSS REFERENCE TO RELATED APPLICATION(S)

This application is based upon and claims benefit of priority from Japanese Patent Application No. 2015-069077, filed on Mar. 30, 2015, the entire contents of which are incorporated herein by reference.

BACKGROUND

The present application relates to a bidirectional optical communication module that encompasses a bidirectional optical communication chip for performing bidirectional optical communication using an optical fiber as an optical transmission path.

As broadband has become widely available in recent years, optical fibers serving as optical transmission paths are being introduced to ordinary households, and an optical network of subscribers to, for example, Fiber-To-The-Home (FTTH) that realizes high-speed communication is becoming realized. With regard to a transmission method used in such an optical network of subscribers, a bidirectional transmission method that performs transmission and reception using a single optical fiber is employed for achieving cost reduction.

In a bidirectional optical communication system terminal installed at the subscriber side (such as an ordinary household) based on the bidirectional transmission method, operation is performed for receiving reception signal light propagated through an optical transmission path and for transmitting transmission signal light toward the outside via the optical transmission path. As main components that fulfill this function, a light emitting element (e.g., a laser diode) that emits the transmission signal light and a light receiving element (e.g., a photodiode) that receives the reception signal light are used. In many cases, the bidirectional optical communication system terminal installed at the subscriber side includes a bidirectional optical communication module that contains the light emitting element and the light receiving element.

It is demanded that the bidirectional optical communication module have a function for efficiently guiding the transmission signal light from the light emitting element to the optical fiber serving as the optical transmission path and for efficiently guiding the reception signal light from the optical fiber to the light receiving element. The bidirectional optical communication system terminal needs to be reduced in size to an extent that the installation location does not require a very large space when the subscriber installs this terminal.

JP H10-206678A discloses an optical semiconductor element module as an example of a bidirectional optical communication module. The optical semiconductor element module includes a semiconductor laser constituting a transmitting section and a photodiode constituting a receiving section that are contained in separate packages, and further includes a band-pass filter that functions as a wavelength-division multiplexing (WDM) filter that divides the reception signal light and the transmission signal light from each other. These packages and the band-pass filter together constitute the optical semiconductor element module. Furthermore, JP H11-68705A attempts to reduce the size of a bidirectional optical communication module and the manufacturing costs thereof by integrating a semiconductor laser, a photodiode, and a WDM filter (dielectric multilayer filter) on an optical circuit board (silicon (Si) substrate).

SUMMARY

However, with the optical semiconductor element module disclosed in JP H10-206678A, it is difficult to achieve size reduction since the transmitting section and the receiving section are contained in separate packages. In addition, the optical semiconductor element module has to be fabricated by arranging the optical components used for forming the individual parts while driving and adjusting the optical components, thus resulting in an increase in manufacturing costs. In the optical transmission-reception module disclosed in JP H11-68705A, the type of WDM filter equipped in this module has limitations in terms of size reduction, and the number of components required for mounting the WDM filter onto the optical circuit board cannot be reduced. Therefore, there are inevitable limitations to reduction of manufacturing costs, reduction of production yield, and size reduction of the module.

The inventor of the present application has reached an idea of creating a bidirectional optical communication module including a bidirectional optical communication chip having an optical circuit board in which a light receiving element, a transmitting element, and a WDM filter are hybrid-integrated. In this bidirectional optical communication module, an optical path is formed such that a propagation direction of transmission signal light output from a transmitting section and reception signal light received by a receiving section is directed to a direction orthogonal to the optical circuit board, so that the overall size of the module can be reduced.

Accordingly, the present application proposes a bidirectional optical communication module that can be reduced in overall size.

In order to achieve this, a bidirectional optical communication module having the following configuration is provided in accordance with the gist of the present application.

A bidirectional optical communication module according to the present application includes a bidirectional optical communication chip, a reflecting section, and an optical coupling element. The bidirectional optical communication chip includes an optical circuit board in which a light receiving element constituting a receiving section, a transmitting element constituting a transmitting section, and a WDM filter that divides transmission signal light and reception signal light from each other are hybrid-integrated. The reflecting section has a function of directing a propagation direction of the transmission signal light output from the transmitting section and the reception signal light received by the receiving section to a direction orthogonal to the optical circuit board. The optical coupling element spatially optically-couples an input-output port for the transmission signal light and the reception signal light provided at the bidirectional optical communication chip to an input-output port of an optical fiber.

In the bidirectional optical communication chip, the optical circuit board is fixed on a header such that a bottom surface of the optical circuit board is fixed in a direction crossing a vertical direction of a top surface of a header. Moreover, a fiber stub that supports the optical fiber is fixed such that a waveguide direction near the input-output port of the optical fiber is orthogonal to the top surface of the header.

Generally, an optical circuit board is bonded onto an electric wiring board so as to be combined therewith as a bidirectional optical communication chip. On the electric wiring board, accessory components, such as auxiliary circuits, required for individually driving the semiconductor laser and the photodiode are disposed. In other words, an additional space for installing these accessory components has to be ensured in the vicinity of the optical circuit board. Fixing the bottom surface of the optical circuit board orthogonally to the top surface of the header implies that the electric wiring board, which is larger in size than the optical circuit board, is fixed orthogonally to the top surface of the header, resulting in increased distance from the top surface of the header, including the electric wiring board, to the input-output port of the optical fiber.

In contrast, in the bidirectional optical communication module according to the present application, the bottom surface of the optical circuit board in which the light receiving element, the transmitting element, and the WDM filter are hybrid-integrated is fixed in a direction crossing a vertical direction (for example, parallel to) of a top surface of a header. Moreover, the reflecting section is configured to direct the propagation direction of the transmission signal light and the reception signal light to the direction orthogonal to the optical circuit board.

Therefore, the optical circuit board can be shortened at least by the dimension in the propagation direction of the transmission signal light and the reception signal light, as compared with a configuration in which the reflecting section is not provided and in which the bottom surface of the optical circuit board is fixed orthogonally to the top surface of the header such that the propagation direction of the transmission signal light and the reception signal light is directed directly toward the input-output port of the optical fiber.

Furthermore, although a bonding pad provided at the optical circuit board and a bonding pad provided on the top surface of the header are electrically wired by wire-bonding, this wiring process becomes significantly easier by fixing the bottom surface of the optical circuit board parallel to the top surface of the header, thereby contributing to reduction of manufacturing costs.

DETAILED DESCRIPTION OF THE EMBODIMENT(S)

Figure 1:
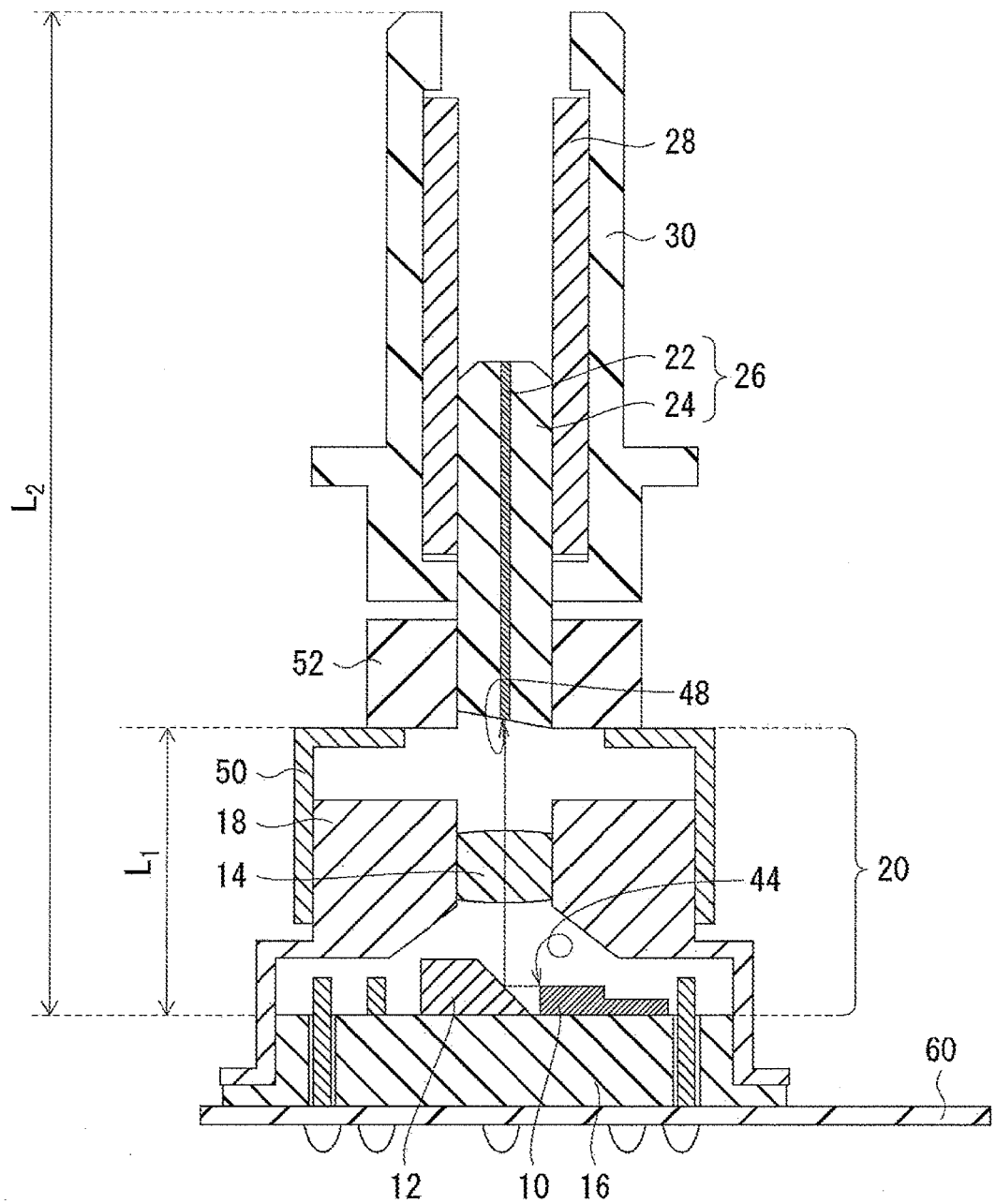
FIG. 1 is a diagram illustrating a bidirectional optical communication module according to the present application.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

Bidirectional Optical Communication Module

Figure 2:
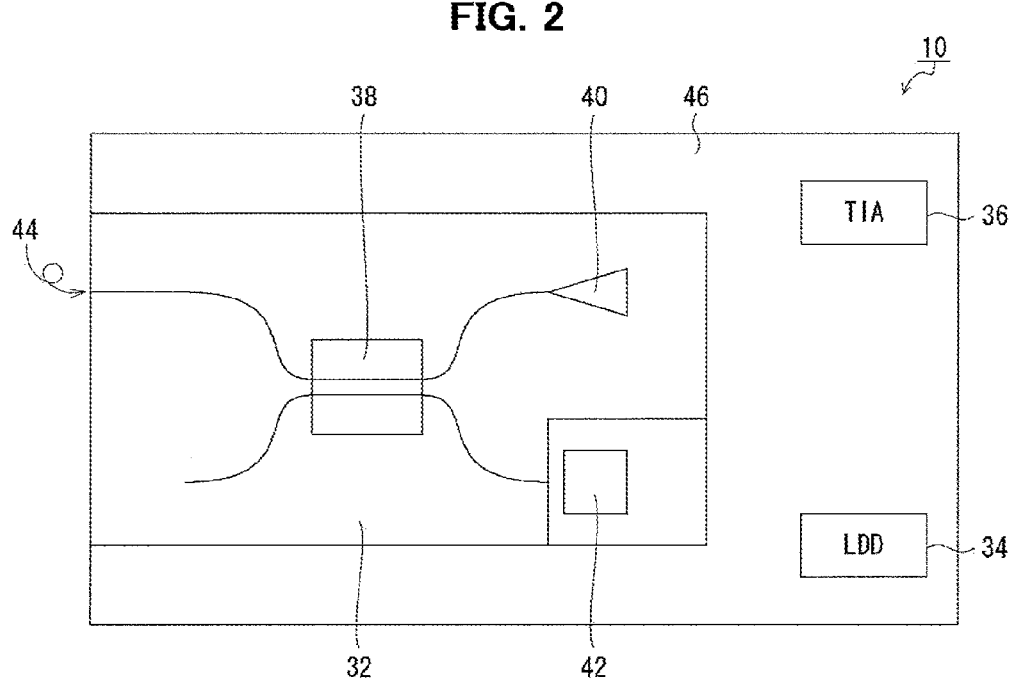
FIG. 2 is a diagram illustrating a bidirectional optical communication chip.

An embodiment of a bidirectional optical communication module according to the present application will be described with reference to FIG. 1 and FIG. 2. FIG. 1 is a schematic sectional view taken along a plane including an optical axis of the bidirectional optical communication module according to the embodiment of the present application. FIG. 2 is a diagram illustrating the top surface of a bidirectional optical communication chip, as viewed from above.

As shown in FIG. 1, the bidirectional optical communication module according to the embodiment of the present application includes a bidirectional optical communication chip 10, a reflecting section, and an optical coupling element as main components. In the bidirectional optical communication module shown in FIG. 1, the optical coupling element is a convex lens 14, and the reflecting section is a reflecting mirror 12. The bidirectional optical communication chip 10 is bonded to the top surface of a header 16, which is a base stage including electrical pins of a package.

As shown in FIG. 2, the bidirectional optical communication chip 10 is formed by bonding an optical circuit board 32 onto an electric wiring board 46. A light receiving element 40, a transmitting element 42, and a wavelength-division multiplexing (WDM) filter 38 that divides transmission signal light and reception signal light from each other are hybrid-integrated in the optical circuit board 32. As an alternative to bonding the optical circuit board 32 onto the electric wiring board 46, the optical circuit board 32 and the electric wiring board 46 may be bonded to different positions on the top surface of the header 16. Even in this case, the bottom surface of the optical circuit board 32 is similarly fixed parallel to the top surface of the header 16.

A photodiode (e.g., germanium (Ge) photodiode) may be used as the light receiving element 40, and a laser diode may be used as the transmitting element 42. In the optical circuit board 32 shown in FIG. 2, a photodiode is built therein, and a laser diode is attached in an embedded state to a recess partially formed in the optical circuit board 32. The photodiode is formed to receive reception signal light propagated through an optical waveguide formed in the optical circuit board 32, and the laser diode is disposed such that output light therefrom is introducible to the optical waveguide formed in the optical circuit board 32.

The electric wiring board 46 has disposed therein integrated circuits, such as a laser diode drive (LDD) 34 and a transimpedance amplifier (TIA) 36. As the WDM filter 38, any WDM filter can be appropriately used so long as it is of a waveguide type that can be formed in the optical circuit board 32. For example, a directional optical coupler may be preferably used but is not limited thereto. A waveguide-type WDM filter having a built-in Bragg reflector may also be appropriately used.

A transmitting section formed in the bidirectional optical communication chip 10 includes, for example, the laser diode (transmitting element 42) and the LDD 34 for driving the laser diode. A receiving section includes the photodiode (light receiving element 40) and the TIA 36 used for converting electric current output from the photodiode into a usable voltage signal.

As shown in FIG. 1, the bidirectional optical communication module according to the embodiment of the present application may include a bidirectional-optical-communication-component package unit 20 and a receptacle 30 that encompasses a fiber stub 26 constituted of an optical fiber 22, which is an optical transmission path, and a ferrule 24. The fiber stub 26 is fitted to a sleeve 28 and is inserted inside the receptacle 30 while being maintained in a stable state by the sleeve 28.

As mentioned above, the bidirectional optical communication chip 10 is formed by bonding the optical circuit board 32 onto the electric wiring board 46. Therefore, the bottom surface of the optical circuit board 32 and the top surface of the electric wiring board 46 that constitute the bidirectional optical communication chip 10 are parallel to each other. By bonding the bottom surface of the electric wiring board 46 to the top surface of the header 16, the bottom surface of the optical circuit board 32 and the top surface of the header 16 become parallel to each other. In FIG. 1, the bidirectional optical communication chip 10 is simply illustrated without differentiating the optical circuit board 32 and the electric wiring board 46 from each other.

A cap 18 having a transmission window that transmits transmission signal light and reception signal light is attached to the header 16, such that the reflecting mirror 12 and the bidirectional optical communication chip 10 are sealed. A holder 50 is disposed to surround the outer periphery of the cap 18. The holder 50 has a window that allows transmission signal light and reception signal light to pass through, and a cylindrical member 52 is adhered above this window. A lower portion of the fiber stub 26 is secured to the cylindrical member 52 by being fitted thereto. An upper portion of the ferrule 24 is fitted to the sleeve 28, and the sleeve 28 is fitted to the receptacle 30.

Specifically, the upper portion of the fiber stub 26 is inserted into the sleeve 28, and the lower portion of the fiber stub 26 is secured by being fitted to the cylindrical member 52, so that the cylindrical member 52 and the receptacle 30 are combined with each other via the fiber stub 26.

Furthermore, the optical fiber 22 is supported by the fiber stub 26 such that the waveguide direction of a portion of the optical fiber 22 extending through the ferrule 24 (i.e., the waveguide direction near an input-output port of the optical fiber 22) is orthogonal to the top surface of the header 16. An input-output port 44 for transmission signal light and reception signal light provided at the optical circuit board 32 and an input-output port 48 of the optical fiber 22 are spatially optically-coupled to each other via the convex lens 14.

The reflecting mirror 12 constituting the reflecting section has a function of directing the propagation direction of transmission signal light output from the transmitting element 42 and reception signal light received by the light receiving element 40 to a direction orthogonal to the optical circuit board 32. The convex lens 14 serving as an optical coupling element optically couples the input-output port 44 and the input-output port 48 of the optical fiber 22 to each other.

As shown in FIG. 1, in an upper empty space inside the receptacle 30, an input-output port portion of an externally-routed optical fiber to be connected to the bidirectional optical communication module is fitted and inserted to a ferrule (not shown) similar to the ferrule 24, so that the optical fiber 22 and the externally-routed optical fiber become optically connected to each other.

Normally, the bidirectional optical communication module is mounted onto a printed circuit board 60 by fixing the header 16 to the printed circuit board 60, which is formed by fixing an electronic component to a flat insulator base material and is used for electric wiring. As the printed circuit board 60 on which the bidirectional optical communication module is mounted, a rigid board that uses a nonflexible insulator base material, a flexible board that uses a thin flexible material as the insulator base material, or a rigid-flexible board that uses a combination of a rigid material and a thin flexible material may be used.

Configuration Example of Reflecting Section

Figure 3:
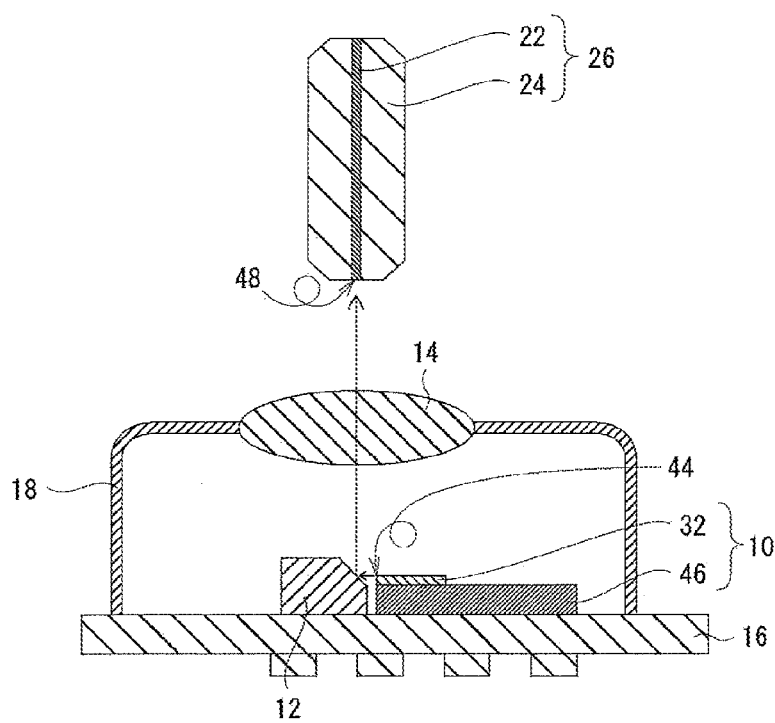
FIG. 3 is a diagram illustrating an embodiment in which a reflecting mirror is used as a reflecting section.
Figure 4:
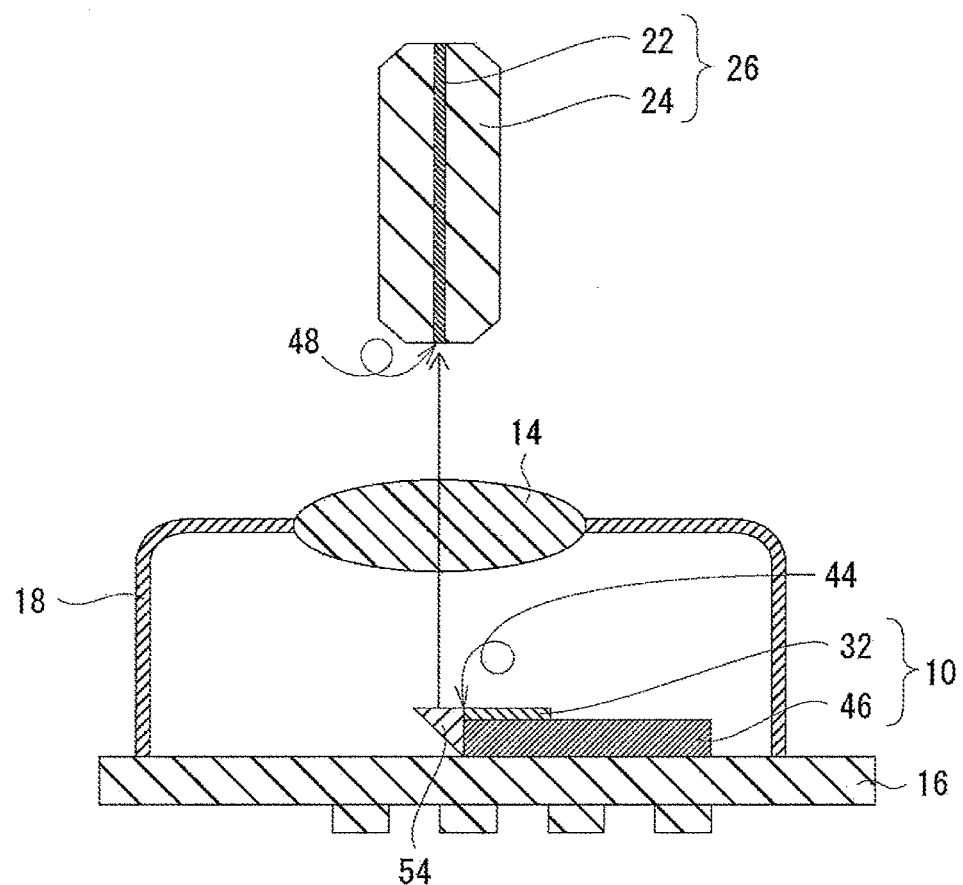
FIG. 4 is a diagram illustrating an embodiment in which a total reflection prism is used as a reflecting section.

The configuration of the reflection section that directs the propagation direction of transmission signal light and reception signal light to the direction orthogonal to the optical circuit board will now be described with reference to FIG. 3 and FIG. 4. FIG. 3 schematically illustrates an embodiment in which the reflecting mirror 12 is used as the reflecting section. FIG. 4 schematically illustrates an embodiment in which a total reflection prism 54 is used as the reflecting section.

In the case where the reflecting mirror 12 constitutes the reflecting section as shown in FIG. 3, the reflecting mirror 12 may be formed by using, for example, borosilicate glass BK-7 as a glass material. The reflecting mirror 12 can be formed by diagonally cutting one ridgeline area of block-shaped BK-7 at 45 degrees and then forming a mirror surface by alternately coating this diagonally-cut surface with multiple layers of tantalum pentoxide ($TaO_5$) films and silicon oxide ($SiO_2$) films. Alternatively, the reflecting mirror 12 may be formed by diagonally cutting one ridgeline area of a block-shaped silicon crystal at 45 degrees and then forming a vapor-deposited gold film over this diagonally-cut surface.

After fabricating the reflecting mirror 12 based on the above-described method (i.e., the method of alternately coating the BK-7 slope surface with multiple layers of tantalum pentoxide ($TaO_5$) films and silicon oxide ($SiO_2$) films), a reflectance of 98% or higher is obtained relative to s-polarized light and p-polarized light having wavelengths of 1.31 μm and 1.49 μm, respectively.

The reflecting section can also be formed by using the total reflection prism 54, as shown in FIG. 4. In this case, the bidirectional optical communication chip 10 is formed by bonding the optical circuit board 32 to the electric wiring board 46 while aligning first end surfaces of the two boards with each other, and is also formed so that the input-output port 44 for transmission signal light and reception signal light provided at the optical circuit board 32 can be adhered to one of surfaces of the total reflection prism 54 that flank the right angle of a rectangular equilateral triangle thereof. In order to achieve this, the total reflection prism 54 may be adhered to an end surface of the optical circuit board 32 by using an optical adhesive having a refractive index equal to that of the glass material used for forming the total reflection prism 54.

Forming the reflecting section by using the total reflection prism 54 as shown in FIG. 4 allows for saving of the space above the header 16, as compared with the case where the aforementioned reflecting mirror 12 is used. Moreover, by preparing the bidirectional optical communication chip 10 and the total reflection prism 54 as an integrated component in advance prior to attaching them onto the header 16, the process for attaching this integrated component onto the header 16 can be achieved in a single step. In contrast, in the case where the aforementioned reflecting mirror 12 is used, two steps are required, namely, a step for attaching the bidirectional optical communication chip 10 onto the header 16 and a step for attaching the reflecting mirror 12 onto the header 16 while adjusting the positional relationship of the reflecting mirror 12 relative to the bidirectional optical communication chip 10.

Other Configuration Examples of Reflecting Section and Optical Coupling Element

In the embodiment described above, the reflecting section is constituted by the reflecting mirror 12 or the total reflection prism 54 and the optical coupling element is constituted by the convex lens 14 in the bidirectional optical communication chip 10 formed by bonding the optical circuit board 32 onto the electric wiring board 46. The inventor of the present application has examined other embodiments that can achieve an objective of realizing a bidirectional optical communication module with a reduced overall size by fixing the bottom surface of the optical circuit board 32 parallel to the top surface of the header 16 and reducing the dimension in the propagation direction of transmission signal light and reception signal light.

First, it is examined whether the reflecting section can be formed by devising the configuration of the input-output port 44 for transmission signal light and reception signal light provided at the optical circuit board 32. As a result, the inventor has reached an idea of diagonally cutting an end of the optical circuit board 32 serving as a terminal end of the optical waveguide formed in the optical circuit board 32 at 45 degrees (i.e., diagonally cutting the end surface of the optical waveguide at 45 degrees). By mirror-finishing this cut surface, if this mirror-finished surface can function as a total reflection surface, this total reflection surface functions as the reflecting section.

Figure 5A:
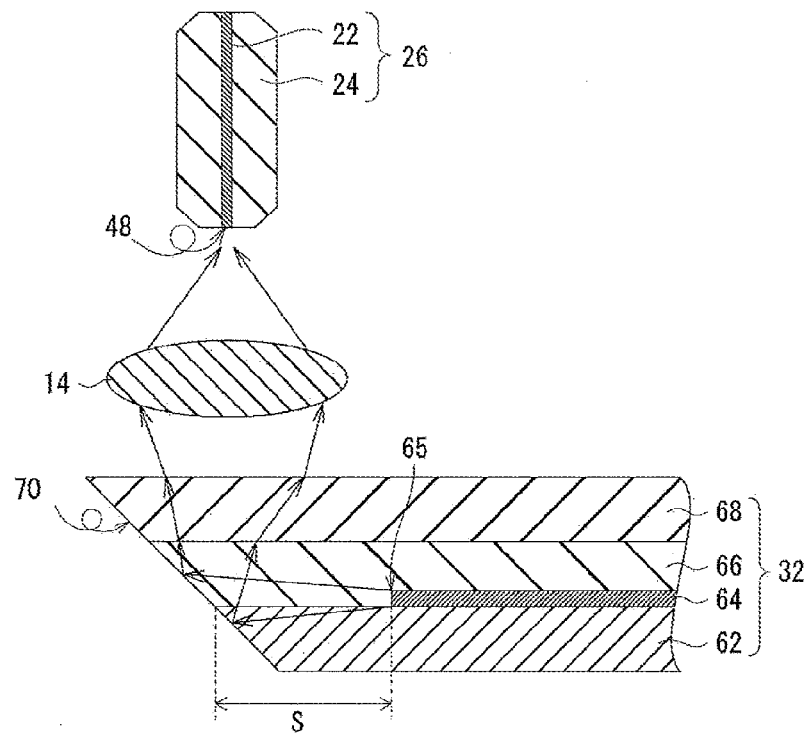
FIGS. 5A and 5B are diagrams each illustrating an embodiment in which the reflecting section is formed by mirror-cutting an end surface of an optical waveguide of an optical circuit board at 45 degrees, FIG. 5A illustrating a configuration in which the optical circuit board is not provided with an optical coupling element, FIG. 5B illustrating a configuration in which the optical circuit board is provided with an optical coupling element.
Figure 5B:
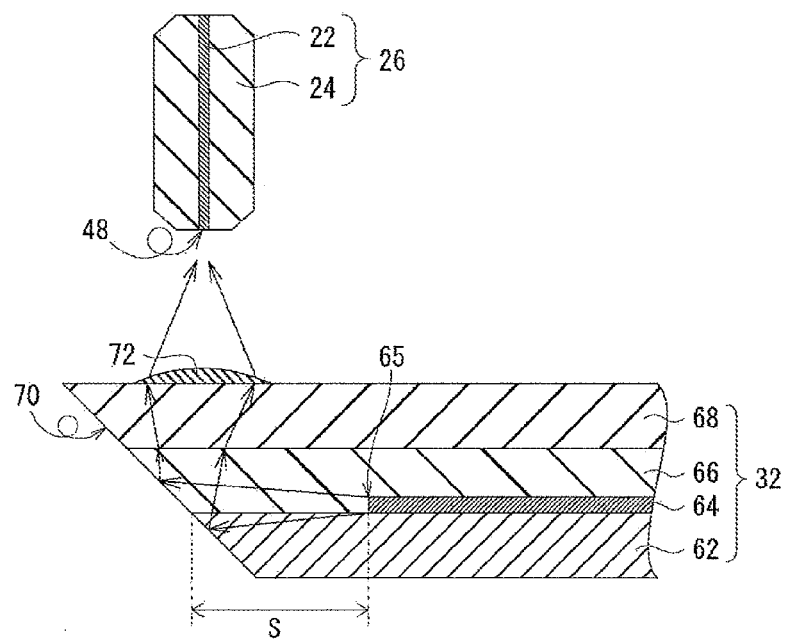

A configuration in which a mirror-finished surface obtained by diagonally cutting an area near an end surface of the optical circuit board 32 at 45 degrees is made to function as a total reflection surface will now be described with reference to FIGS. 5A and 5B. FIGS. 5A and 5B are schematic diagrams each illustrating a vertical sectional view of the optical circuit board 32 in addition to a vertical sectional view of the reflecting section, the optical coupling element, and the fiber stub 26. As shown in FIGS. 5A and 5B, the optical circuit board 32 is formed by stacking a lower cladding layer 62, an optical waveguide core 64, an upper cladding layer 66, and a cap layer 68 in this order on a surface of a silicon substrate (not shown).

In order to form the optical circuit board 32 by using a silicon substrate, the lower cladding layer 62 and the upper cladding layer 66 may be formed using silicon oxide layers. The silicon oxide layers may be $SiO_2$ layers or $SiO_x$ layers. The optical waveguide core 64 is formed of a silicon layer. The cap layer 68 does not necessarily have to be provided, but may be a $SiO_2$ layer.

As shown in FIGS. 5A and 5B, a total reflection surface 70 can be formed by diagonally cutting an area near the end surface of the optical circuit board 32 at 45 degrees by using, for example, a dicing saw. In this case, the cut surface diagonally cut at 45 degrees has to be mirror-finished. Therefore, after performing the cutting process with a dicing saw, it is desirable that a mirror-finishing process be performed by optical polishing. Due to recent improvements in dicing technologies, there are commercially-available dicing devices that can optically polish cut surfaces simultaneously with the dicing process. Therefore, such dicing devices may also be used.

As shown in FIGS. 5A and 5B, it is preferable that a distance S be ensured from a terminal end 65 of the optical waveguide core 64 to the total reflection surface 70 so that the terminal end 65 of the optical waveguide core 64 does not reach the total reflection surface 70. Accordingly, the distance from the terminal end 65 of the optical waveguide core 64 to the input-output port 48 of the optical fiber 22 can be shortened at least by the distance S, thereby contributing to overall size reduction of the bidirectional optical communication module.

Furthermore, the inventor has examined whether an optical coupling function for optically coupling the terminal end 65 of the optical waveguide core 64 to the input-output port 48 of the optical fiber 22 can be realized by devising the configuration of the optical waveguide core 64, the lower cladding layer 62, and the upper cladding layer 66 of the optical circuit board 32. As a result, the inventor has reached an idea of forming a refractive-index-distributing-type lens including the optical waveguide core 64 by making the refractive indices of the lower cladding layer 62 and the upper cladding layer 66 gradually decrease with increasing distance from the optical waveguide core 64 with respect to a central extension line of the optical waveguide core 64 as a line of symmetry. If a refractive-index-distributing-type lens can be formed, this refractive-index-distributing-type lens can be made to function as an optical coupling element by appropriately adjusting the optical path length for propagation light propagating through the optical waveguide core 64 from the light receiving element 40 and the transmitting element 42 to the total reflection surface 70.

In this case, the terminal end 65 of the optical waveguide core 64 may be formed to reach the total reflection surface 70 without ensuring the distance S, or the distance S may be ensured. In either case, by appropriately setting the focal length of the refractive-index-distributing-type lens, the transmission signal light can be efficiently input to the input-output port 48 of the optical fiber 22, and the reception signal light can be efficiently guided to the optical waveguide core 64.

If the refractive-index-distributing-type lens can be formed in this manner, the convex lens 14 becomes unnecessary so that the number of components constituting the bidirectional optical communication module can be reduced and the process for disposing the convex lens 14 can be omitted, thereby contributing to reduction of manufacturing costs.

As shown in FIG. 5B, a convex lens 72 having a function similar to that of the convex lens 14 may be formed directly on the cap layer 68, which is the topmost surface of the optical circuit board 32, and this convex lens 72 and the refractive-index-distributing-type lens may serve as the optical coupling element.

Although the optical coupling function for optically coupling the terminal end 65 of the optical waveguide core 64 to the input-output port 48 of the optical fiber 22 can be realized with the convex lens 14 alone, the optical coupling function can also be realized with a composite optical system obtained by forming the refractive-index-distributing-type lens and then further adding the convex lens 14 and the convex lens 72 thereto. In this case, a composite optical system constituted of the refractive-index-distributing-type lens and the convex lens 14, a composite optical system constituted of the refractive-index-distributing-type lens and the convex lens 72, or a composite optical system constituted of the refractive-index-distributing-type lens, the convex lens 14, and the convex lens 72 can be regarded as the optical coupling element.

Needless to say, a composite optical system constituted of the convex lens 14 and the convex lens 72 can be regarded as the optical coupling element by making the terminal end 65 of the optical waveguide core 64 reach the total reflection surface 70 without ensuring the distance S and causing output light from the optical waveguide core 64 or input light to the optical waveguide core 64 to be reflected at the total reflection surface 70.

In a case where the refractive-index-distributing-type lens is constituted of the lower cladding layer 62, the optical waveguide core 64, and the upper cladding layer 66, even if the distance S from the terminal end 65 of the optical waveguide core 64 to the total reflection surface 70 is not provided (i.e., S=0), the convex lens 14 can still be disposed at a position near the cap layer 68, which is the topmost surface of the optical circuit board 32, similar to a case where S≠0 when there is no refractive-index-distributing-type lens. This is because, even if the terminal end 65 of the optical waveguide core 64 is made to geometrically reach the total reflection surface 70 due to the use of the refractive-index-distributing-type lens, the shapes of equiphase wave surfaces of transmission signal light and reception signal light in the total reflection surface 70 can be formed similarly to the case where S≠0 when there is no refractive-index-distributing-type lens by appropriately adjusting the focal length of the refractive-index-distributing-type lens.

Size Reduction of Module and Simplified Manufacturing Process

Figure 6:
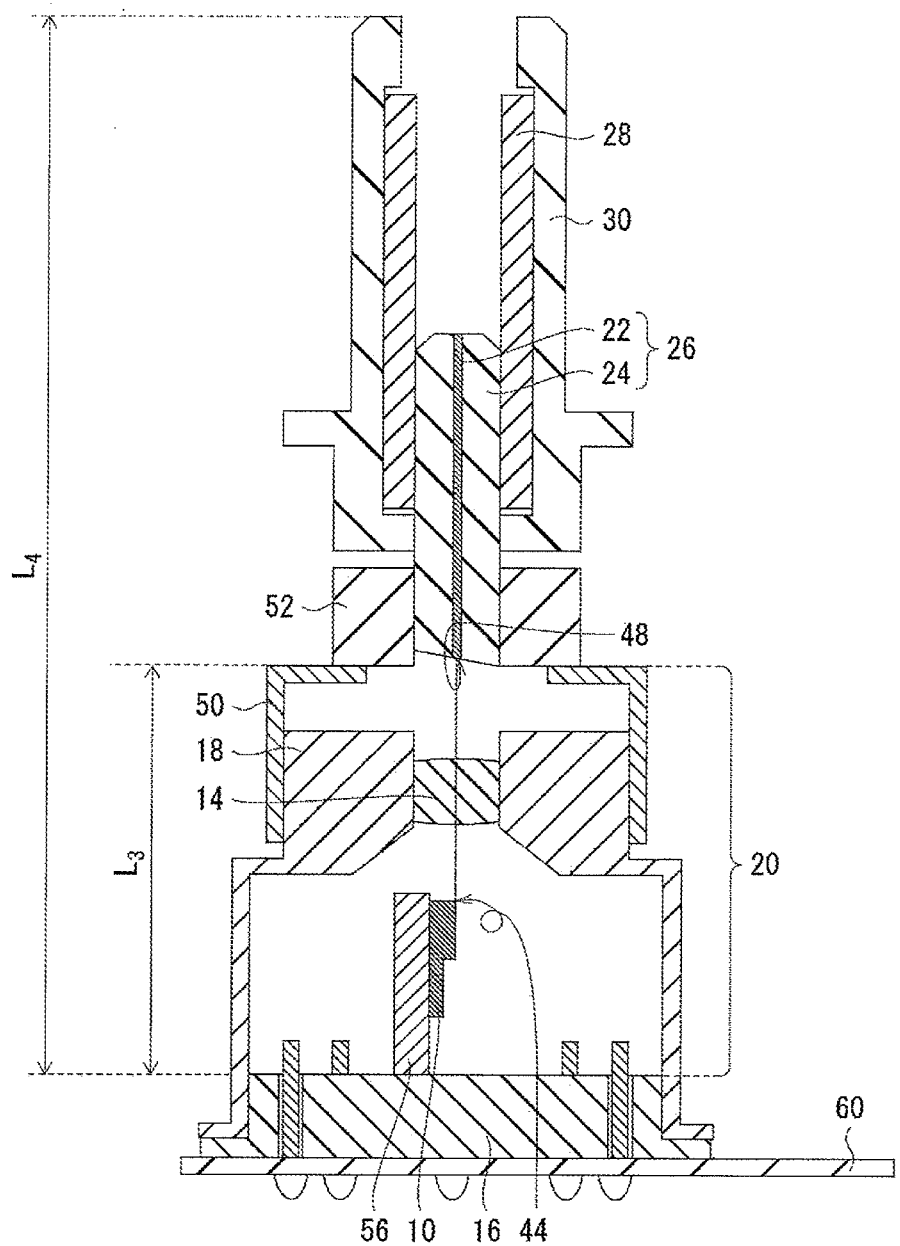
FIG. 6 is a diagram explaining size reduction of a bidirectional optical communication module and is a sectional view illustrating a schematic shape of the bidirectional optical communication module in which the bottom surface of the optical circuit board is fixed orthogonally to the top surface of a header.

The following description with reference to FIG. 1 and FIG. 6 relates to how the length from the top surface of the header 16 to the input-output port 48 of the optical fiber 22 is shortened and the overall size of the module is reduced in the bidirectional optical communication module according to this application. FIG. 6 is a diagram illustrating a schematic shape of a bidirectional optical communication module in which a bidirectional-optical-communication-chip support member 56 is provided on the header 16 and this bidirectional-optical-communication-chip support member 56 is used to fix the bottom surface of the optical circuit board 32 constituting the bidirectional optical communication chip 10 orthogonally to the top surface of the header 16.

According to the bidirectional optical communication module shown in FIG. 6, the reflecting section required for directing the propagation direction of transmission signal light and reception signal light to the direction orthogonal to the optical circuit board 32 is not necessary. This is advantageous in that the number of components can be reduced as much as possible. However, in this case, an overall length $L_3$ of the bidirectional-optical-communication-component package unit 20 and an overall length $L_4$ of the entire bidirectional optical communication module increase in the direction orthogonal to the top surface of the header 16 by an amount equivalent to the length of the bidirectional-optical-communication-chip support member 56 in the lengthwise direction.

In contrast, with the bidirectional optical communication module shown in FIG. 1, since the bidirectional-optical-communication-chip support member 56 is not necessary, an overall length $L_1$ of the bidirectional-optical-communication-component package unit 20 can be made shorter than the overall length $L_3$ of the aforementioned bidirectional-optical-communication-component package unit 20 by the length required for providing the bidirectional-optical-communication-chip support member 56. As a result, an overall length $L_2$ of the entire module shown in FIG. 1 can be made shorter than the overall length $L_4$ of the entire bidirectional optical communication module shown in FIG. 6.

Since the section including the fiber stub 26 and the receptacle 30 has the same length in the bidirectional optical communication modules shown in FIGS. 1 and 6, there is no other way to realize overall size reduction of the bidirectional optical communication module but to shorten the overall length of the bidirectional-optical-communication-component package unit 20 (i.e., $L_1$ in the bidirectional optical communication module according to the present application shown in FIG. 1 and $L_3$ in the bidirectional optical communication module shown in FIG. 6). Therefore, overall size reduction is realized in the bidirectional optical communication module according to the present application (in particular, the length from the top surface of the header 16 to the input-output port 48 of the optical fiber 22 is shortened).

Figure 7:
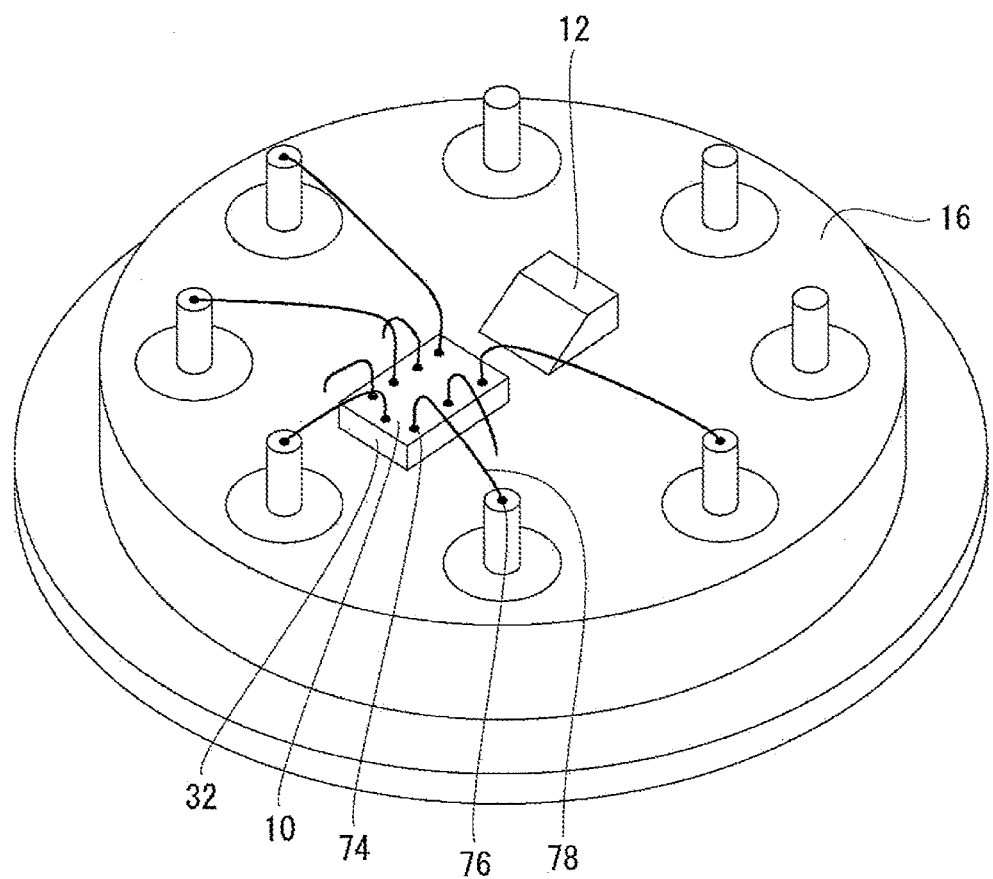
FIG. 7 is a diagram explaining the ease of a wire-bonding process and schematically illustrating a state where wire-bonding has been performed on the header and the bidirectional optical communication chip disposed on the top surface thereof.

Furthermore, since the bidirectional optical communication module according to the embodiment of the present application does not require the bidirectional-optical-communication-chip support member 56, a wire-bonding process between a bonding pad provided at the optical circuit board 32 and a bonding pad provided on the top surface of the header 16 is significantly simplified. This point will be described with reference to FIG. 7. FIG. 7 schematically illustrates the header 16 of the bidirectional optical communication module shown in FIG. 1, the bidirectional optical communication chip 10 and the reflecting mirror 12 disposed on the top surface of the header 16, and a wire-bonded state.

As shown in FIG. 1 (and FIG. 7), in the bidirectional optical communication module in which the bottom surface of the optical circuit board 32 is fixed parallel to the top surface of the header 16, a direction in which a bonding wire 78 is pressure-bonded to a bonding pad 74 of the optical circuit board 32 is the same as a direction in which the bonding wire 78 is pressure-bonded to a bonding pad 76 provided at the header 16. Therefore, the wire-bonding process can be performed similarly to a normal wire-bonding process performed on an electronic integrated circuit. The wire-bonding process may be performed by using a widely-used wire-bonding device and does not require a special technique. In FIG. 7, the electric wiring board 46 is omitted for simplification.

In contrast, in the bidirectional optical communication module in which the bottom surface of the optical circuit board 32 is fixed orthogonally to the top surface of the header 16 as shown in FIG. 6, a plane including the bonding pad 74 provided at the optical circuit board 32 is orthogonal to a plane including the bonding pad 76 provided at the header 16. Therefore, the direction in which a bonding wire is pressure-bonded when wire-bonding to the bonding pad 74 provided at the optical circuit board 32 attached to the bidirectional-optical-communication-chip support member 56 is orthogonal to the direction in which the bonding wire is pressure-bonded when wire-bonding to the bonding pad 76 provided at the header 16. Thus, a special design needs to be added to, for example, the wire-bonding device.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A bidirectional optical communication module, comprising:
   a bidirectional optical communication chip including an optical circuit board having
      a light receiving element constituting a receiving section receiving a reception signal light,
      a transmitting element constituting a transmitting section outputting a transmission signal light,
      a wavelength-division multiplexing (WDM) filter that divides the transmission signal light and the reception signal light from each other, and
      an input-output port optically coupled to the WDM filter and configured to
         receive and then transmit the transmission signal light from the WDM filter, and
         receive the reception signal light and transmit the reception signal light to the WDM filter,
      the light receiving element, the transmitting element and the WDM filter are hybrid-integrated;
   a reflecting section configured to reflect
      the transmission signal light output from the transmitting section and transmitted to the reflecting section via the WDM filter and the input-output port, and
      the reception signal light to the receiving section via the WDM filter and the input-output port so that the reception signal light is received by the receiving section; and
   an optical coupling element including a convex lens configured to optically-couple the input-output port to an input-output port of an optical fiber, via the reflecting section,
   wherein a bottom surface of the optical circuit board is fixed in a direction crossing a direction perpendicular to a top surface of a header, and
   wherein a fiber stub supports the optical fiber and is fixed such that a waveguide direction of the optical fiber near the input-output port of the optical fiber is orthogonal to the top surface of the header.

2. The bidirectional optical communication module according to claim 1,
   wherein the light receiving element is a photodiode,
   wherein the transmitting element is a laser diode,
   wherein the WDM filter is a directional optical coupler, and
   wherein the optical circuit board is a silicon waveguide board obtained by forming a silicon waveguide in a surface of a silicon substrate.

3. The bidirectional optical communication module according to claim 1, wherein the reflecting section is a reflecting mirror attached to the header.

4. The bidirectional optical communication module according to claim 1, wherein the reflecting section is a total reflection prism attached to the optical circuit board.

5. The bidirectional optical communication module according to claim 1, wherein the reflecting section is a total reflection surface formed at the optical circuit board.

6. The bidirectional optical communication module according to claim 1, wherein the convex lens is attached to a transmission window of a cap.

7. The bidirectional optical communication module according to claim 1, wherein the convex lens forms a composite optical system constituted of
   a first convex lens formed directly on a topmost surface of the optical circuit board, and
   a second convex lens attached to a transmission window of a cap.

8. The bidirectional optical communication module according to claim 1, wherein the optical coupling element is a refractive-index-distributing-type lens formed at the optical circuit board.

9. The bidirectional optical communication module according to claim 1, wherein the optical coupling element is a composite optical system constituted of
   a refractive-index-distributing-type lens formed at the optical circuit board, and
   the convex lens, the convex lens being attached to a transmission window of a cap.

10. The bidirectional optical communication module according to claim 1, wherein the optical coupling element is a composite optical system constituted of
    a refractive-index-distributing-type lens formed at the optical circuit board, and
    the convex lens, the convex lens being formed directly on a topmost surface of the optical circuit board.

11. The bidirectional optical communication module according to claim 1, wherein the optical coupling element is a composite optical system constituted of
    a refractive-index-distributing-type lens formed at the optical circuit board, and the convex lens, the convex lens including
       a convex lens attached to a transmission window of a cap, and
       a convex lens formed directly on a topmost surface of the optical circuit board.

* * * * *